(12) United States Patent
Moune et al.

(10) Patent No.: US 8,838,295 B2
(45) Date of Patent: Sep. 16, 2014

(54) ENERGY PROTECTION DEVICE FOR AN AIRCRAFT

(75) Inventors: Marie-Claire Moune, Tournefeuille (FR); Jean Muller, Tournefeuille (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/440,525

(22) Filed: Apr. 5, 2012

(65) Prior Publication Data

US 2013/0110324 A1 May 2, 2013

(30) Foreign Application Priority Data

Apr. 7, 2011 (FR) ...................................... 11 53018

(51) Int. Cl.
  *G01C 23/00* (2006.01)
  *G05D 1/00* (2006.01)
  *G05D 3/00* (2006.01)
  *G06F 7/00* (2006.01)
  *G06F 17/00* (2006.01)

(52) U.S. Cl.
  USPC ............................................................. 701/3

(58) Field of Classification Search
  CPC ................................. B64C 19/00; B64D 31/06
  USPC ............................................................. 701/3
  See application file for complete search history.

(56) References Cited

U.S. PATENT DOCUMENTS

| | | | | |
|---|---|---|---|---|
| 4,319,219 A | * | 3/1982 | Rein-Weston | 340/968 |
| 4,569,021 A | * | 2/1986 | Larson et al. | 701/99 |
| 5,803,408 A | * | 9/1998 | Gast | 244/178 |
| 5,833,177 A | * | 11/1998 | Gast | 244/195 |
| 6,062,513 A | * | 5/2000 | Lambregts | 244/175 |
| 6,880,784 B1 | | 4/2005 | Wilkinson et al. | |
| 7,098,810 B2 | * | 8/2006 | Bateman et al. | 340/963 |
| 2008/0208398 A1 | * | 8/2008 | Delaplace et al. | 701/3 |
| 2009/0177400 A1 | | 7/2009 | Silly et al. | |
| 2010/0100262 A1 | * | 4/2010 | Blanvillain et al. | 701/14 |
| 2012/0253555 A1 | * | 10/2012 | Stange | 701/3 |

FOREIGN PATENT DOCUMENTS

| | | | | |
|---|---|---|---|---|
| EP | 0482250 A1 | * | 4/1992 | G05D 1/06 |
| FR | 2890645 | | 3/2007 | |
| FR | 2897448 | | 8/2007 | |

OTHER PUBLICATIONS

French Patent Office, Preliminary Search Report for FR 1153018, Dec. 8, 2011 (2 pgs.).

* cited by examiner

*Primary Examiner* — Calvin Cheung
*Assistant Examiner* — Paula L Schneider
(74) *Attorney, Agent, or Firm* — Wood, Herron & Evans, LLP

(57) ABSTRACT

An energy protection device includes a plurality of sensors that detect a triggering situation requiring an energy protection and a control unit that actuates an energy protection function when the triggering situation is detected and also activates an autothrottle. When the control unit begins the energy protection function, an original engagement state of the autothrottle before the triggering is stored. Thus, when the aircraft returns to an operational flight domain not requiring the energy protection function, the control unit stops the energy protection function and sets an engagement state of the autothrottle based on the stored original engagement state.

16 Claims, 1 Drawing Sheet

ENERGY PROTECTION DEVICE FOR AN AIRCRAFT

TECHNICAL FIELD

The present invention relates to an energy protection device for an aircraft, more specifically a transport airplane.

More precisely, said device is intended for protecting the aircraft from low energy situations (low speed, high incidence, low engine thrust) able to jeopardize the safety of the aircraft, more specifically near the ground.

BACKGROUND

Generally, such a device usually includes:
means for monitoring upon a flight of the aircraft, automatically and repeatedly, a plurality of data of the aircraft so as to be able to detect a low energy situation, for which conditions relative to a low energy are met; and
means for automatically activating in the case where a low energy situation is detected, a protection function involving automatically engaging an autothrottle autothrust ("ATHR") and automatically controlling the engines of the aircraft so as to supply a maximum thrust.

The protection function is defined in guiding and flight control calculators for the aircraft, and thus generates, in all cases where the aircraft is in a low energy situation, an automatic increase of the thrust so as to achieve the maximum engine thrust, and this whatever regardless of the initial position of the throttles of the aircraft.

From documents FR-2 890 645 and WO-2007/031634, an energy protection device is known for an airplane being provided with at least one engine arranged on each one of its wings and with at least one additional engine. Such a protection device has a broad domain of use, wherein the safety of the airplane is maintained. To this end, it comprises means for inhibiting the protection function, but inhibiting such a function only when all the engines being arranged on one single same wing of the airplane are simultaneously defective, such a situation making critical the dissymmetry created for the lateral control of the airplane. This allows the number of inhibition cases to be considerably reduced. Consequently, such a protection device has a much broader domain of use than previous conventional devices, in particular in the case of one single engine becoming defective or in the case of two engines becoming defective, being arranged on different wings.

When the conditions for triggering a previously activated protection function are no longer met, the autothrottle remains engaged, the maximum thrust is still applied to the engines, and an appropriate message is displayed on a flight mode annunciator of the aircraft.

The protection function could, indeed, be disengaged thru disengaging the autothrottle, requiring a manual action from the pilot. More precisely, in order to disengage the autothrottle, the pilot should act on a dedicated disconnection means, or on the throttles so as to bring them in the idling position, or even on a controlling means relative to the autothrottle on a display of the Flight Control Unit ("FCU") type.

Consequently, current airplanes exhibit the following restriction. In order to get out of the above mentioned protection mode, pilots have to disconnect manually the autothrottle as a result of the protection function being triggered and this even if the autothrottle was engaged before this protection function was triggered, in order to omit maintaining the blocked engine thrust at the maximum thrust of the Take Off, Go Around "TOGA" type. The crew have afterwards to re-engage the autothrottle for continuing the flight, if the autothrottle is used for the remainder of the flight. So, the crew must sometimes carry out various successive actions so as to return back to a situation being compatible with the remainder of the flight. The crew's workload is thus significant in such a situation.

The present invention aims at solving these drawbacks. It relates to an energy protection method for an aircraft provided with at least one engine and one autothrottle allowing for automatically managing going out of a protection function.

SUMMARY OF THE INVENTION

To this end, according to the invention, the method includes:
a) during a flight of the aircraft, automatically and repeatedly, a plurality of data of the aircraft is monitored, so as to be able to detect a triggering situation, for which conditions for triggering an energy protection are met; and
b) in the case where a triggering situation is detected, a protection function is automatically activated, involving automatically engaging the autothrottle if the autothrottle is not already engaged and automatically controlling the engine(s) of the aircraft so as to provide a maximum thrust:
c) in the case where the protection function is triggered, the engagement state of the autothrottle is automatically recorded upon the triggering, and a monitoring is implemented, involving automatically and repeatedly monitoring parameters of the aircraft, so as to be able to detect a return back to a predetermined operational flight domain; and
d) in the case of a return of the aircraft back to the operational flight domain being detected, the protection function is automatically deactivated and the autothrottle is automatically brought in an engagement state depending on the recorded engagement state (upon triggering the protection).

Thus, thanks to the invention, in the case of a return of the aircraft back to a particular operational flight domain being detected, to be set forth hereinunder, the protection function is automatically deactivated and the state of the autothrottle is automatically managed. No action is thus required from a pilot in such a phase of going out of the energy protection mode, allowing, more specifically, overcoming the above mentioned drawbacks.

Moreover, as set forth hereinunder, the autothrottle is (automatically) brought in a state depending on the previously recorded engagement state upon triggering the protection function, such a new state being adapted to the flight phase able to be implemented at the current time, as set forth hereinunder.

Advantageously, at step c), a return of the aircraft back to said operational flight domain is detected, when the two following conditions are simultaneously met:
the current corrected speed (of the VCAS calibrated airspeed type) of the aircraft is higher, during at least one predetermined period of time, than the sum of a reference speed (of the VLS type (meaning lowest selectable speed with authothrust engaged)) depending on the current flight configuration of the aircraft and a predetermined threshold value; and
the conditions for triggering the energy protection are no longer achieved.

Furthermore, in a first embodiment, at step d):
d1a) if the memorized engagement state indicates that the autothrottle was engaged upon triggering the protection function, said autothrottle is maintained engaged. In this case, the thrust applied to the engines of the aircraft is thus fully managed by the autothrottle; and d1b) if the memorized engagement state indicates that the autothrottle was disengaged upon said triggering, said autothrottle is automatically disengaged, out of a particular situation of going around of the aircraft. In such a case, the thrust applied to the engines (upon going out of the energy protection function) corresponds to the manual thrust controlled by a pilot via the throttle.

Furthermore, advantageously, if the aircraft is in a going around situation in the case of a return back to the operation flight domain being detected, and if it is not in a smooth configuration, the autothrottle is maintained engaged at step dib), enabling to anticipate a homogeneous behaviour with the situation existing out of protection.

In addition, in a second embodiment, at step d):

d2a) if the memorized engagement state indicates that the autothrottle was engaged upon triggering the protection function, said autothrottle is maintained engaged; and d2b) with the exception of two above described particular situations, if the memorized engagement state indicates that the autothrottle was disengaged upon said triggering, said autothrottle is maintained engaged, but the target speed of said autothrottle is synchronized with a maneuver speed. Such synchronization allows for a return back to a target speed adapted for the flight point.

Advantageously, said maneuver speed depends on the aerodynamic configuration of the aircraft upon the detection of a return of the aircraft back to the operational flight domain.

Moreover, advantageously, at step d2b), if the aircraft is in one of the two following particular situations: a going around situation in a hypersustained configuration and a selected approach situation, the speed of the autothrottle is not synchronized, as it is already adapted for the corresponding situation. Indeed:

the target speed upon going around is the current speed of the airplane as memorized upon going around; and the target speed upon a selected approach is the approach speed as calculated by a flight management system of the FMS type.

The present invention further relates to an energy protection device for an aircraft, in particular a transport airplane, being provided with at least one engine and one autothrottle.

According to this invention, the energy protection device includes:

means for checking, upon a flight of the aircraft, automatically and repeatedly, a plurality of data of the aircraft so as to be able to detect a triggering situation, for which conditions for triggering an energy protection are met; and means for automatically activating, in the case where a triggering situation is detected, a protection function involving automatically engaging the autothrottle and automatically controlling the engine(s) of the aircraft so that they supply a maximum thrust, means for automatically recording, in the case where the protection function is triggered, the engagement state of the autothrottle upon triggering;

means for, in the case where said protection function is triggered, implementing a monitoring, involving automatically and repeatedly monitoring parameters of the aircraft, so as to be able to detect a return of the aircraft back to a predetermined operational flight domain; and means for, in the case a return of the aircraft is detected back to the operational flight domain, automatically deactivating the protection function and automatically bringing the autothrottle in an engagement state depending on said recorded engagement state.

Such a device according to this invention thus allows to automatically go out of a preliminarily activated energy protection function, and to avoid maintaining the blocked engine thrust at the maximum thrust of the TOGA type.

The present invention further relates to an aircraft, in particular a transport airplane, comprising a device such as mentioned hereinabove.

BRIEF DESCRIPTION OF THE DRAWINGS

The FIGS. of the appended drawing will better explain how this invention can be implemented. In these FIGS., like reference numerals relate to like components.

DETAILED DESCRIPTION

Figure 1:
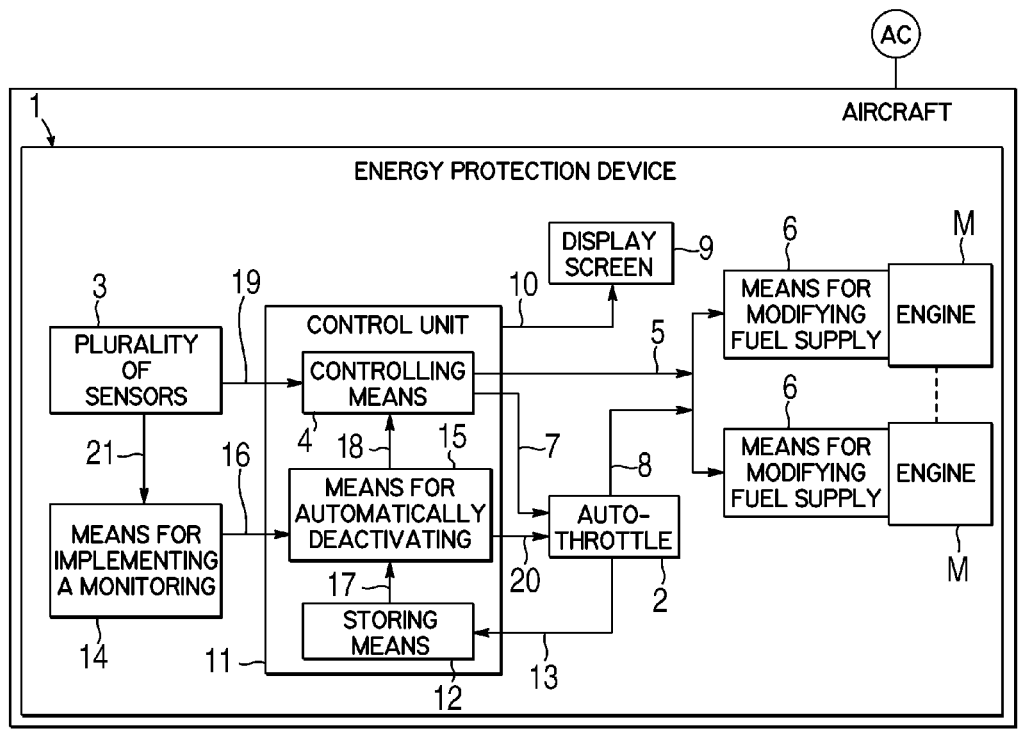
FIG. 1 is the block diagram of an energy protection device according to this invention.

The energy protection device 1 according to the invention and schematically shown on FIG. 1 is for an aircraft (AC), in particular a transport airplane, being provided with at least one, but preferably with a plurality of engines M, as well as with one autothrottle 2.

This energy protection device 1 includes elements as described below allowing to protect the aircraft from low energy situations (low speed, high incidence, low engine thrust) that would jeopardize safety, more specifically near the ground.

To this end, the energy protection device 1 includes:

monitoring means for 3 automatically monitoring monitor during a flight of the aircraft, a plurality of data of said aircraft so as to be able to detect a triggering situation, for which the conditions for triggering an energy protection are met; and controlling means 4 being connected via a link 19 to the monitoring means 3 and being formed so as to automatically activate a protection function (preferably of the ALPHA FLOOR type), when a triggering situation is detected by the monitoring means 3. This protection function involves automatically controlling the engines M so as to modify the thrust being delivered so that the engines each supply a maximum thrust. To this end, the controlling means 4 are connected via links 5 to means 6 intended for modifying the thrust exerted by the engines M, more specifically for modifying the fuel supply of the engines M. The controlling means 4 also automatically engage (via a link 7) the autothrottle 2 being, for instance, connected via a link 8 to the means 6.

Obviously, if the protection function is not activated, the different engines M of the aircraft are usually controlled, following usual order, by the pilot of the aircraft using the throttle.

The energy protection device 1 could further comprises a display means 9 being connected via a link 10 to a control unit 11 (described further below) and being able to display a message warning a pilot of the aircraft about any activation of the protection function, for instance, displaying an appropriate message on a screen, such as a primary flight screen of the Primary Flight Display ("PFD") type for instance.

In a particular embodiment, the monitoring means 3 comprise a plurality of sensors for respectively measuring at least some of the following parameters: the incidence of the aircraft, the angle of pitch of the aircraft, the pitching rate, the speed of the aircraft, as well as its deceleration rate, the Mach number of the aircraft, the position of slats and flaps of the aircraft, the radio-altitude height of the aircraft. The monitoring means 3 monitor such parameters for being able to detect a low energy situation of the aircraft.

Preferably, the monitoring means 3 detect a triggering situation for activating the protection function, if the energy of the aircraft is excessively low, in one of the two following cases:
   the leading edge of the aircraft is larger than a protection value (or the angle of pitching is larger than a predetermined threshold and the order of the joystick is larger than a predetermined threshold to pull up); and
   the filtered leading edge becomes larger than thresholds defined by the flight qualities.

Thus, upon the activation of the protection function, the different following actions are implemented:
   an automatic engagement of the autothrottle 2;
   an application of the maximum thrust to the engines M; and
   a display of a corresponding message on a flight mode annunciator of the aircraft of the Flight Mode Annunciator ("FMA") type, being, for instance, located on the upper part of a primary flight screen of the PFD type (e.g. at display screen 9).

According to this invention, the energy protection device 1 further includes:
   means for recording 12 (also referred to as storing means 12) (connected for instance via a link 13 to the autothrottle 2), in the case where the protection function is triggered, the engagement state of the autothrottle 2 (engaged autothrottle or disengaged autothrottle) at the moment of triggering an energy protection by the monitoring means 3 and the controlling means 4;
   means 14 that, in the case where the protection function is triggered, for implementing a monitoring, involving automatically and repeatedly monitoring parameters of the aircraft, so as to be able to detect a return of the aircraft back to a predetermined operational flight domain; and
   means 15 being connected via links 16 and respectively to the means for implementing a monitoring 14 and the means for recording 12 and being formed so as to automatically implement the following operations, in the case where the means for implementing a monitoring 14 detects a return of the aircraft back to the operational flight domain:
   automatically bringing the autothrottle 2 back to the engagement state recorded by the means for recording 12, for instance via a link 20.

Thus, in the case of a detection of a return of the aircraft back to a particular operational flight domain, as described below, the energy preservation device 1 according to the current invention automatically deactivates the protection function and automatically manages the state of the autothrottle 2. No action is thus required from the pilot in such a phase of going out of the energy protection mode.

Moreover, as described further below, the autothrottle 2 is brought (automatically) back to a state depending on the prior recorded engagement state, such a state being adapted for the flight phase of the current moment.

In a particular embodiment, the controlling means 4, the means for recording 12, and the means 15 could, more specifically, be part of a control unit 11.

Furthermore, the means for implementing a monitoring 14 detects a return of the aircraft back to the operational flight domain, when the two following conditions are simultaneously met:
   first condition: the current corrected speed VCAS of the aircraft is larger, during at least one predetermined period of time, than the sum of a reference speed depending on the current flight configuration of the aircraft, of the VLS type, and a predetermined threshold value; and
   second condition: the conditions for triggering the energy protection are no longer met, such a condition being, for instance, deduced from a piece of information received from the monitoring means 3 via a link 21.

Figure 2:
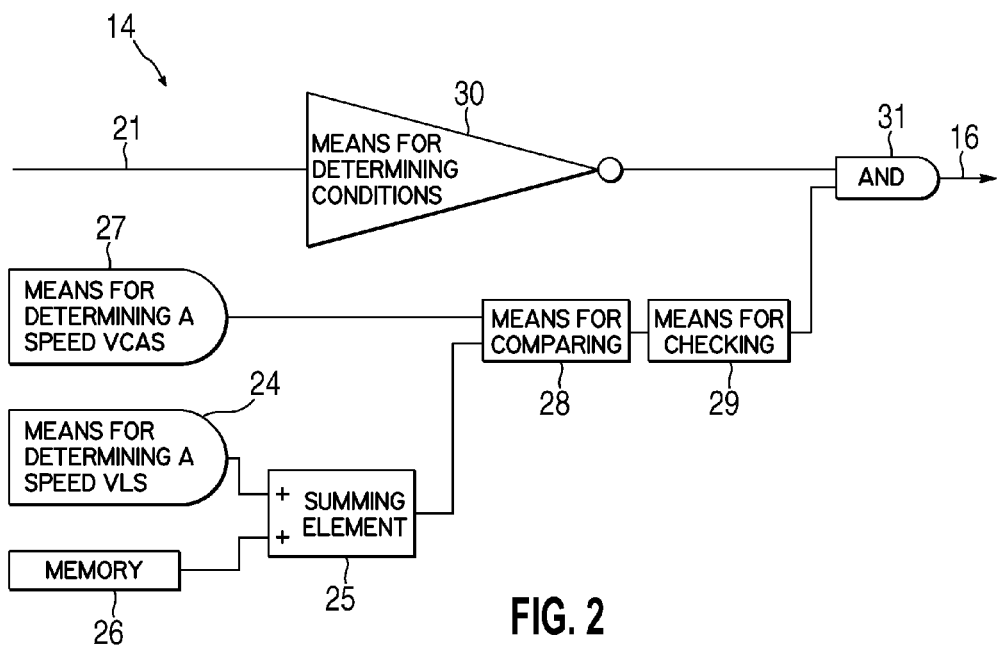
FIG. 2 is the block diagram of a particular embodiment of elements being part of an energy protection device of FIG. 1, and that detects a return of the aircraft back to a predetermined operational flight domain.

In a particular embodiment, shown on FIG. 2, the means for implementing a monitoring 14 includes:
   means for determining 24 a speed VLS of the aircraft;
   a summing element 25 that adds the speed VLS received from the means for determining a speed VLS 24 to a threshold value being, for instance, recorded in a memory 26;
   means for determining 27 a current corrected speed VCAS of the aircraft;
   means for comparing 28 the speed VCAS received from the means for determining a current corrected speed VCAS 27 with the sum received from the summing element 25 and that checks whether the speed VCAS is larger than said sum;
   means for checking 29 that the speed VCAS is higher than the sum for a predetermined period of time; and
   an AND logic gate 31 for detecting a return of the aircraft back to the operational flight domain when the two following conditions are simultaneously met:
   the speed VCAS is larger than the sum for the predetermined period of time, such a condition being determined by the means for checking 29; and
   the conditions for triggering the energy protection are no longer met, such a condition being, for instance, received from means for determining conditions 30. To this end, the means 30 reverses the piece of information of the achievement of the triggering conditions received via the link 21.

The above mentioned threshold value is defined so that the energy protection is not triggered again immediately after going out of the protection, so as to avoid too frequent switches between operating states.

Hereinafter, two embodiments are provided according to this invention, allowing to go out automatically of the protection function and to omit maintaining the blocked engine thrust at the maximum thrust TOGA.

In a first embodiment:
   if the engagement state memorized by the means for recording 12 indicates that the autothrottle 2 was engaged at the triggering CF the protection function, autothrottle 2 is maintained engaged. In such a case, the thrust applied to the engines M of the aircraft is thus fully managed by the autothrottle 2 when active; and
   if the engagement state memorized by the means for recording 12 indicates that the autothrottle 2 was disengaged at the triggering, the autothrottle 2 is automatically disengaged, outside of a particular going around situation of the aircraft. In such a case, the thrust applied to the engines M (after going out of the energy protection function) corresponds to the manual thrust controlled by the throttle.

On the other hand, if the aircraft is in a particular Go-Around situation, in the case of a return back to the operational flight domain being detected, the autothrottle 2 is maintained engaged. This is therefore an exception to the principle involving memorizing the engagement state of the autothrottle 2 in a Go-Around situation, in the case where the aircraft is not in a smooth aerodynamic configuration (slats/flaps). In a Go-Around situation, in a hypersustained aerodynamic configuration, after the protection function has been activated, the autothrottle 2 must remain engaged after the return back to the operational flight domain, even if it was initially disengaged. Indeed, generally (except for a protection case), the autothrottle 2 is engaged when the crew triggers the Go-Around situation.

The exception involving maintaining the autothrottle 2 engaged even if it was not engaged before the protection function was triggered allows to recover a homogeneous behaviour with the out of protection function situation of the ALPHA FLOOR type.

Moreover, in a second embodiment:

if the engagement state memorized by the means for recording 12 indicates that the autothrottle 2 was engaged at the triggering of the protection function, the autothrottle 2 is maintained engaged by the means 15; and with the exception of two particular situations described below, if the engagement state memorized by the means for recording 12 indicates that the autothrottle 2 was disengaged at the triggering, said autothrottle 2 is maintained engaged. In addition, the energy protection device 1 (for instance via the means 15) synchronizes the target speed of the autothrottle 2, that is the speed that the autothrottle 2 tries to achieve, on a maneuver speed. Such synchronization enables to recover a target speed adapted for the flight point.

Advantageously, the maneuver speed depends on the aerodynamic configuration of the aircraft upon the detection of a return of the aircraft back to the operational flight domain.

By way of illustration, the maneuver speed is as set forth below, in the case of an airplane comprising the following aerodynamic configurations of slats and flaps: a so-called "smooth" configuration, a configuration being referred to as configuration 1, a so-called configuration 2, a so-called configuration 3, and a so-called "Full" configuration.

In such a case, the maneuver speed preferably corresponds:
- in the smooth configuration, to the maximum fineness speed, referred to as "green dot speed";
- in the configuration 1, to a speed S recommended upon take-off for selecting the smooth configuration;
- in the configuration 2, to a speed F2 recommended in configuration 2 in an approach for selecting the configuration 3;
- in the configuration 3, to a speed F3 recommended in configuration 3 in an approach for selecting the configuration Full; and
- in the configuration Full, to the sum of the speed VLS and of a predefined threshold.

An exception is applied (including no re-synchronization of the target speed, even if the autothrottle 2 was disengaged before the protection function) in the case of a Go-Around situation in a hypersustained aerodynamic configuration or if an approach Flight Management System ("FMS") phase has been selected at an FMS. In these two cases, the target speed is relevant and, it is therefore not required to resynchronize it. Indeed:

the target speed upon a Go-Around situation is the current speed of the aircraft as memorized during going around; and the target speed upon a selected approach is the approach speed calculated by the FMS system.

Consequently, in this second embodiment, the autothrottle 2 is still maintained engaged after the protection function has been triggered, when the aircraft returns back to the operational flight domain, except in the two previous situations. However, if the autothrottle 2 was initially disengaged before the protection function was triggered, the target speed is resynchronized with the maneuver speed, so as to recover a relevant target speed as a function of the flight point.

The invention claimed is:

1. An energy protection method performed by an energy protection device on board an aircraft that also includes at least one engine and an autothrottle, the method comprising:
    (a) monitoring, automatically and repeatedly with a plurality of sensors included in the energy protection device, a plurality of data of the aircraft during a flight of the aircraft, so as to detect a triggering situation caused by a low energy situation, in which a predetermined operational flight domain has ended and an energy protection function should be activated to avoid the low energy situation defined by at least one of low speed, high incidence, and low engine thrust; and
    (b) activating the protection function, with a control unit connected to the sensors when the triggering situation is detected by the sensors, the activating including automatically engaging the autothrottle into an active engagement state if the autothrottle is not already engaged and automatically controlling the at least one engine so that the at least one engine supplies a maximum thrust and maintains the maximum thrust during the protection function;
    (c1) recording an original engagement state of the autothrottle, automatically with the control unit included in the energy protection device when the triggering situation is detected, the original engagement state being defined at the time of the triggering situation and before the activating at step (b);
    (c2) implementing a monitoring when the triggering situation is detected, to automatically and repeatedly monitor parameters of the aircraft, so as to detect a return back to the predetermined operational flight domain; and
    (d) automatically deactivating the protection function, with the control unit included in the energy protection device, and setting the autothrottle with the control unit into a new engagement state based on the original engagement state recorded in the control unit, when a return back to the predetermined operational flight domain is detected in step (c2), thereby avoiding a continued maintaining of supplying maximum thrust at the at least one engine.

2. The method according to claim 1, wherein step (c2) further comprises:
    determining whether a current corrected speed of the aircraft, is larger than a sum of:
        a reference speed and
        a predetermined threshold value; and
    sensing whether conditions defining the triggering situation for triggering an activation of the energy protection function are no longer achieved,
    wherein the return back to the predetermined operational flight domain is not detected until both the current correct speed is larger than the sum and the conditions defining the triggering situation are no longer achieved.

3. The method according to claim 1, wherein step (d) further comprises:
    (d1a) maintaining the autothrottle in an active engagement state, with the control unit, if the recorded original engagement state indicates that the autothrottle was engaged at the time of the triggering situation; and
    (d1b) disengaging the autothrottle, with the control unit, if the recorded original engagement state indicates that the autothrottle was disengaged at the time of the triggering situation, except if a crew of the aircraft has activated a Go Around Situation requiring autothrottle engagement.

4. The method according to claim 3, wherein step (d1b) further comprises:
    maintaining the autothrottle in an active engagement state, with the control unit, if the aircraft is in the Go Around Situation and if the recorded original engagement state indicates that the autothrottle was disengaged at the time of the triggering situation.

5. The method according to claim 1, wherein step (d) further comprises:
    (d2a) maintaining the autothrottle in an active engagement state, with the control unit, if the recorded original engagement state indicates that the autothrottle was engaged at the time of the triggering situation; and (d2b) maintaining the autothrottle in an active engagement state and synchronizing a target speed of the autothrottle with a maneuver speed, with the control unit, if the recorded original engagement state indicates that the autothrottle was disengaged at the time of the triggering situation.

6. The method according to claim 5, wherein the maneuver speed depends on an aerodynamic configuration of the aircraft when the aircraft returns back to the predetermined operational flight domain.

7. The method according to claim 5, wherein step (d2b) further comprises:
maintaining the autothrottle in an active engagement state but not synchronizing the target speed of the autothrottle, with the control unit, if a crew of the aircraft has activated a Go Around Situation or if the crew has selected an approach phase at a flight management system.

8. An energy protection device for an aircraft including at least one engine and an autothrottle, said energy protection device comprising:
a plurality of sensors on board the aircraft that monitor, automatically and repeatedly during a flight of the aircraft, a plurality of data of the aircraft so as to detect a triggering situation caused by a low energy situation, in which a predetermined operational flight domain has ended and an energy protection function should be activated to avoid the low energy situation defined by at least one of low speed, high incidence, low engine thrust; and
a control unit connected to the plurality of sensors, the control unit activating the protection function automatically when the triggering situation is detected, the activating including automatically engaging the autothrottle into an active engagement state if the autothottle is not already engaged and automatically controlling the at least one engine so that means for modifying fuel supply cause the at least one engine to supply a maximum thrust and maintain the maximum thrust during the protection function, wherein the control unit automatically records, when the triggering situation is detected, an original engagement state of the autothrottle defined at the time of the triggering situation and before the activating of the protection function; and
means for implementing a monitoring connected to the plurality of sensors and implementing a monitoring, when the triggering situation is detected, including automatically and repeatedly monitoring parameters of the aircraft, so as to detect a return back to the predetermined operational flight domain,
wherein the control unit is connected to the means for implementing a monitoring system, the control unit automatically deactivating the protection function and setting the autothrottle into a new engagement state based on the original engagement state recorded in the control unit, when the means for implementing a monitoring system detects a return back to the predetermined operational flight domain) thereby avoiding a continued maintaining of supplying maximum thrust at the at least one engine.

9. An airplane, comprising:
at least one engine;
an autothrottle connected to the at least one engine; and
an energy protection device connected to the autothrottle, the energy protection device further comprising:
a plurality of sensors on board the aircraft that monitor, automatically and repeatedly during a flight of the aircraft, a plurality of data of the aircraft so as to detect a triggering situation caused by a low energy situation, in which a predetermined operational flight domain has ended and an energy protection function should be activated to avoid the low energy situation defined by at least one of low speed, high incidence, and low engine thrust; and
a control unit connected to the plurality of sensors, the control unit activating the protection function automatically when the triggering situation is detected, the activating including automatically engaging the autothrottle into an active engagement state if the autothottle is not already engaged and automatically controlling the at least one engine so that means for modifying fuel supply cause the at least one engine to supply a maximum thrust and maintain the maximum thrust during the protection function, wherein the control unit automatically records, when the triggering situation is detected, an original engagement state of the autothrottle defined at the time of the triggering situation and before the activating of the protection function; and
means for implementing a monitoring connected to the plurality of sensors and implementing a monitoring, when the triggering situation is detected, including automatically and repeatedly monitoring parameters of the aircraft, so as to detect a return back to the predetermined operational flight domain,
wherein the control unit is connected to the means for implementing a monitoring system, the control unit automatically deactivating the protection function and setting the autothrottle into a new engagement state based on the original engagement state recorded in the control unit, when the means for implementing a monitoring system detects a return back to the predetermined operational flight domain, thereby avoiding a continued maintaining of supplying maximum thrust at the at least one engine.

10. The method according to claim 1, further comprising:
(e) displaying a message indicating activation of the energy protection function, with a display screen associated with the energy protection device, so that a crew of the aircraft is informed about the triggering situation leading to engagement of the autothrottle.

11. The energy protection device according to claim 8, further comprising:
a display screen connected to the control unit, the display screen displaying a message indicating activation of the energy protection function, so that a crew of the aircraft is informed about the triggering situation leading to engagement of the autothrottle.

12. The energy protection device according to claim 8, wherein the means for implementing a monitoring further comprises:
means for determining conditions that senses whether conditions defining the triggering situation for triggering an activation of the energy protection function are no longer achieved;
means for determining a speed VCAS that calculates a current corrected speed of the aircraft;
means for determining a speed VLS that calculates a reference speed depending on the current flight configuration of the aircraft;
a memory for storing a predetermined threshold value;

a summing element that adds the reference speed to the predetermined threshold value to generate a sum; and means for comparing that determines whether the current corrected speed of the aircraft is larger than the sum of the reference speed and the predetermined threshold value, wherein the return back to the predetermined operational flight domain is not detected by the means for implementing a monitoring system until both the current correct speed is larger than the sum and the conditions defining the triggering situation are no longer achieved.

13. The energy protection device according to claim 8, wherein the control unit maintains the autothrottle in an active engagement state if the recorded original engagement state indicates that the autothrottle was engaged at the time of the triggering situation, and wherein the control unit disengages the autothrottle if the recorded original engagement state indicates that the autothrottle was disengaged at the time of the triggering situation, except if a crew of the aircraft has activated a Go Around Situation requiring autothrottle engagement.

14. The energy protection device according to claim 13, wherein the control unit maintains the autothrottle in an active engagement state if the aircraft is in the Go Around Situation and if the recorded original engagement state indicates that the autothrottle was disengaged at the time of the triggering situation.

15. The energy protection device according to claim 8, wherein the control unit maintains the autothrottle in an active engagement state if the recorded original engagement state indicates that the autothrottle was engaged at the time of the triggering situation, and wherein the control unit maintains the autothrottle in an active engagement state and synchronizes a target speed of the autothrottle with a maneuver speed if the recorded original engagement state indicates that the autothrottle was disengaged at the time of the triggering situation.

16. The energy protection device according to claim 15, wherein the control unit maintains the autothrottle in an active engagement state but does not synchronize the target speed of the autothrottle if a crew of the aircraft has activated a Go Around Situation or if the crew has selected an approach phase at a flight management system.

* * * * *